United States Patent
Garcia et al.

(10) Patent No.: US 10,673,706 B2
(45) Date of Patent: Jun. 2, 2020

(54) INTEGRATED INFRASTRUCTURE AND APPLICATION PERFORMANCE MONITORING

(71) Applicant: CA, Inc., Islandia, NY (US)

(72) Inventors: Julio Cesar Garcia, Islandia, NY (US); James Perkins, Islandia, NY (US); Mark Costilow, Islandia, NY (US)

(73) Assignee: CA TECHNOLOGIES, INC., New York, NY (US)

( * ) Notice: Subject to any disclaimer, the term of this patent is extended or adjusted under 35 U.S.C. 154(b) by 323 days.

(21) Appl. No.: 15/420,517

(22) Filed: Jan. 31, 2017

(65) Prior Publication Data

US 2018/0219743 A1 Aug. 2, 2018

(51) Int. Cl.
*H04L 12/24* (2006.01)
*H04L 12/26* (2006.01)

(52) U.S. Cl.
CPC .......... *H04L 41/12* (2013.01); *H04L 41/0213* (2013.01); *H04L 41/046* (2013.01); *H04L 41/22* (2013.01); *H04L 43/045* (2013.01); *H04L 43/08* (2013.01)

(58) Field of Classification Search
CPC ... H04L 41/12; H04L 41/0213; H04L 41/046; H04L 41/22; H04L 43/045; H04L 43/08
USPC ......................................... 709/217, 221–224
See application file for complete search history.

(56) References Cited

U.S. PATENT DOCUMENTS

| | | | | |
|---|---|---|---|---|
| 8,194,674 B1* | 6/2012 | Pagel | ................. | H04L 12/4641 370/393 |
| 8,848,544 B2* | 9/2014 | Bar-Tor | ............. | H04L 41/0631 370/250 |
| 2003/0228146 A1* | 12/2003 | Fortin | ................. | H04J 14/0278 398/45 |
| 2004/0122922 A1* | 6/2004 | Da Palma | ............... | H02J 13/00 709/223 |
| 2005/0223366 A1 | 10/2005 | Smith et al. | | |

(Continued)

OTHER PUBLICATIONS

'Pre-Con Ed: Simplify Administration and Reporting in CA APM 10', CA World '16, pp. 1 to 75.

(Continued)

*Primary Examiner* — Cheikh T Ndiaye
*Assistant Examiner* — Melaku Y Habtemariam
(74) *Attorney, Agent, or Firm* — Shook, Hardy & Bacon L.L.P.

(57) ABSTRACT

Provided is a process of correlating information organized according to a logical architecture of a distributed application to information organized according to a network architecture of computers executing the distributed application, the process including: obtaining a logical-architecture topology of a logical architecture of a distributed application executing on a plurality of computing devices; obtaining a network-architecture topology of a physical architecture of the plurality of computing devices executing the distributed application; inferring pairs of logical-architecture host identifiers and network-architecture host identifiers that refer to the same computing device to produce a cross-namespace mapping that correlates the logical-architecture namespace with the network-architecture namespace; and storing the cross-namespace mapping in memory.

20 Claims, 5 Drawing Sheets

(56) References Cited

U.S. PATENT DOCUMENTS

| | | | |
|---|---|---|---|
| 2012/0005658 A1 | 1/2012 | Bansal | |
| 2012/0036552 A1 | 2/2012 | Dare et al. | |
| 2012/0144246 A1 | 6/2012 | Dreyfoos et al. | |
| 2013/0051399 A1* | 2/2013 | Zhang | H04L 47/12 370/401 |
| 2013/0058250 A1* | 3/2013 | Casado | H04L 12/4633 370/254 |
| 2014/0089901 A1 | 3/2014 | Hadar | |
| 2015/0195178 A1 | 7/2015 | Bhattacharya et al. | |
| 2016/0191345 A1 | 6/2016 | Despotovic et al. | |
| 2016/0197803 A1 | 7/2016 | Talbot et al. | |
| 2016/0356665 A1 | 12/2016 | Felemban et al. | |

OTHER PUBLICATIONS

'Host (network)', Wikipedia, Dec. 19, 2016, pp. 1 to 2.
'Class InetAddress', http://docs.oracle.com/javase/7/docs/api/java/net/InetAddress.html#getH, Jan. 13, 2016, pp. 1 to 12.
'Why does InetAddress.getLocalHost().getHostName() return a value different from bash "hostname"?', http://stackoverflow.com/questions/11143880/why-does-inetaddress-getlocalhost-gethostname-return-a-value-different-from, Jun. 27, 2016, pp. 1 to 2.
'Pre-Con Education: What Is CA Unified Infrastructure Management (formerly known as CA Nimsoft Monitor) and what's new in version 8.0', CA World '14, pp. 1 to 74.
'Pre-Con Education: What's New in CA Application Performance Management 10.1', CA World '15, pp. 1 to 52.
'Integrated Performance Management for Physical, Virtual & Cloud Infrastructure' https://web.archive.org/web/20161215051845/https://www.manageengine.com/products/applications_manager/apm-virtual-cloud.html, Dec. 15, 2016, pp. 1 to 4.
'Announcing next-generation APM', https://www.datadoghq.com/blog/announcing-apm/, Sep. 21, 2016, pp. 1 to 11.
'Knowledge Base', https://web.archive.org/web/20151022030136/https://www.manageengine.com/network-monitoring/kbase.html, Oct. 22, 2015, pp. 1 to 38.

\* cited by examiner

INTEGRATED INFRASTRUCTURE AND APPLICATION PERFORMANCE MONITORING

BACKGROUND

1. Field

The present disclosure relates generally to computing applications and, more specifically, to integrated infrastructure and application performance monitoring of computing applications.

2. Description of the Related Art

Distributed applications are used in a variety of contexts. Often, the computing resources offered by a single computer are insufficient to process data at a scale presented within a latency budget. Further, in some cases, a single computing device presents a single point of failure, and designers distribute an application over several computing devices to provide backup capacity or redundancy. In many cases, an application is divided into multiple components, and those components are executed on different computing devices (e.g., in different racks in a data center, or in different data centers). In some cases, multiple instances of a given application component are executed to provide concurrent operations that address scaling and redundancy needs, and in some cases, application components are pipelined to allow computing devices to be configured for particular needs of different operations in the pipeline (or to divide the application into more manageable portions). In many cases, these design choices can lead to substantial complexity, making the application and computing hardware difficult to monitor and otherwise manage.

SUMMARY

The following is a non-exhaustive listing of some aspects of the present techniques. These and other aspects are described in the following disclosure.

Some aspects include a process of correlating information organized according to a logical architecture of a distributed application to information organized according to a network architecture of computers executing the distributed application, the process including: obtaining a logical-architecture topology of a logical architecture of a distributed application executing on a plurality of computing devices; obtaining a network-architecture topology of a physical architecture of the plurality of computing devices executing the distributed application; inferring pairs of logical-architecture host identifiers and network-architecture host identifiers that refer to the same computing device to produce a cross-namespace mapping that correlates the logical-architecture namespace with the network-architecture namespace; and storing the cross-namespace mapping in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
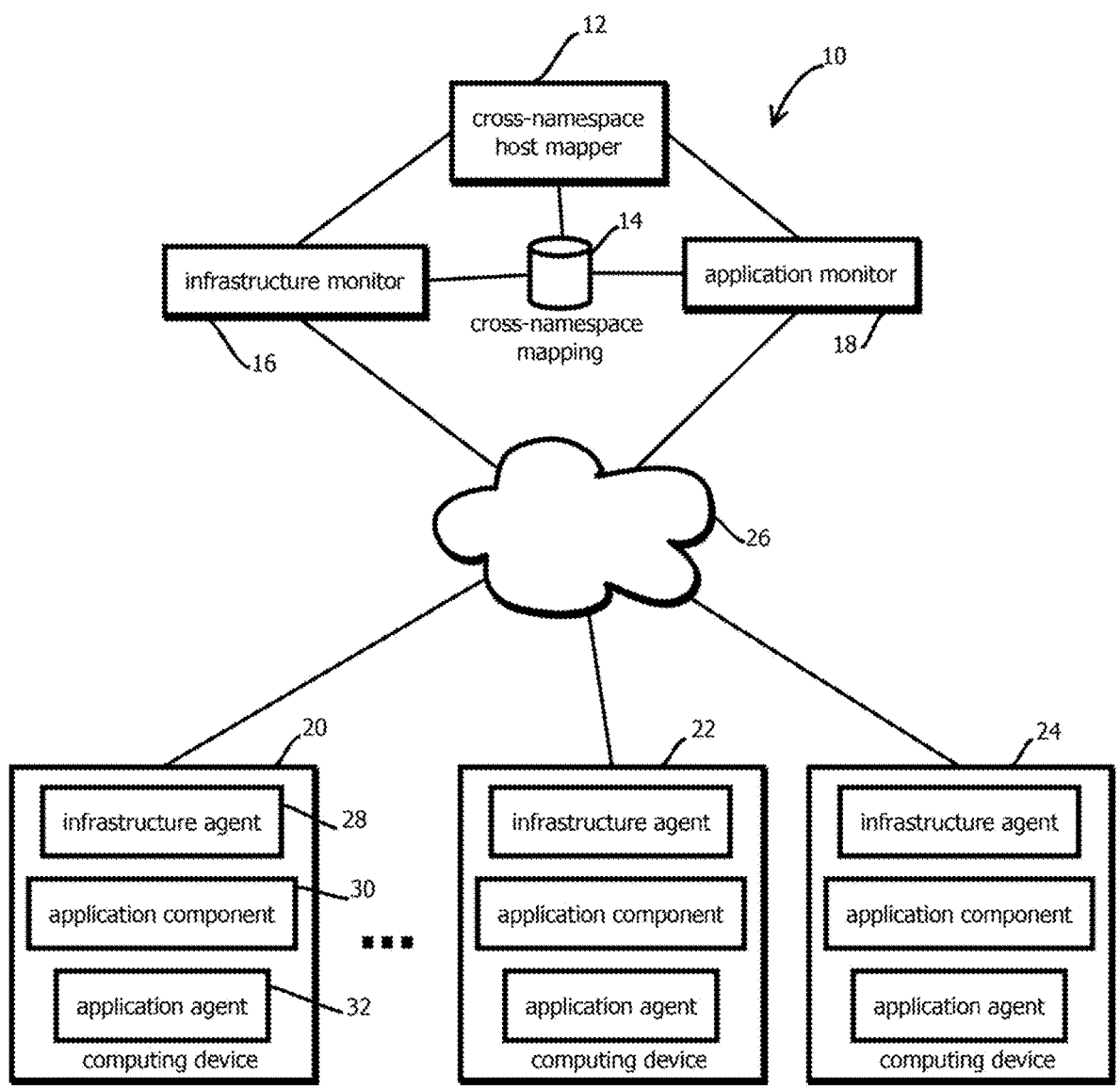
FIG. 1 is a block diagram of a computing environment having a cross-namespace mapper in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and distributed application monitoring. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Infrastructure monitoring applications may be used to monitor and manage data center deployments and, in particular, those in a multi-tenancy use case, like in the enterprise cloud (e.g., with offerings like Amazon Web Services™ or Azure™). Examples include the Unified Infrastructure Management (UIM)™ application by CA Technologies of New York, N.Y., among others. Some implementations automatically discover computing devices, gather metrics (like central processing unit (CPU) usage, memory usage, network activity, etc.) and alarms about the computing devices, and aggregate the gathered data in various dashboards and reports. In some cases, this data is gathered and reported to a central server by an agent installed on monitored devices. An administrator console may be used to configure and deploy the monitors, also called "robots" in some products, which may be configured to have "probes," domain specific sets of monitoring routines.

Similarly, application performance monitoring applications monitor and, in some cases manage, distributed applications. Examples include Application Performance Management (APM) by CA Technologies of New York, N.Y., among others. These tools may be used to monitor the performance of applications by providing fine-grained response times (and other metrics) attributable to portions of a call graph of the application (e.g., indicating which method, of the 20 called servicing a request, is running particularly slow). In some cases, this is done by instrumenting the monitored code, e.g., by adding code that makes a timestamped function call both when a monitored method starts and terminates.

In many cases, application performance monitoring and infrastructure monitoring applications do not communicate with one another effectively. Generally, application performance monitoring provides a top-down view, from the perspective of logical architecture of an application, of various metrics that affect performance, while infrastructure monitoring provides a bottom-up, physical architecture view. When analyzing a distributed application (e.g., troubleshooting performance problems in a web application), analysts often manually correlate metrics provided by these systems, but it is desirable to improve upon this process by correlating (and extending upon the correlations) computationally. It should be emphasized that the present techniques do more than merely automate tasks performed previously manually, as manual analyses often do not effectively generate responsive user interfaces by which technicians may explore underlying causes to problems or detect potential root causes across monitoring regimes.

A challenge with integrating data from these different types of monitoring applications is that the different applications identify computational entities (e.g., computing devices, virtual machines, containers, or various other network hosts) differently, in some cases due to their different perspectives and associated interfaces to the monitored device or code. To mitigate this issue, some embodiments match host identifiers across a plurality of different monitoring applications that are monitoring the same computing devices or code executing on those computing devices. In some cases, the match is not simply a match between hosts having the same name, as the different monitoring applications often interrogate the same host but receive different names in response due to different interfaces and configurations.

In some cases, the various hosts are organized in topologies, and the topologies may be matched based on host-identifier pairs. In some cases, a user interface (UI) displaying one or more of the topologies may be augmented with links between the two systems by which the user may navigate from a logical architecture view (e.g., of the application performance monitoring topology with various metrics of application performance) to physical architecture (e.g., an infrastructure monitoring topology with various metrics pertaining to the same). For instance, an analyst may notice in an application performance dashboard that a subset of instances of a particular routine in a particular application have relatively high latency, and that analyst may select a given measurement that is slow to see which logical-architecture-perspective host is slow. The view may be augmented with a link to the corresponding network-architecture host identifier tied to infrastructure monitoring data on which that particular instance was executed. The analyst may select that link and view a list of other applications executing on the same hardware and notice that one of the servers behind a load balancer has higher CPU usage due to a larger load and adjust the allocation of work within the system or increase the number of instances to which the load balancer routes work.

To these ends and others, some embodiments may perform operations including the following:

1) Ingest output from instrumented application code reporting metrics of particular subsets of a call graph of the application and parameters of the host on which those subsets are running.
2) Form a first topology of a logical architecture based on the ingested output of the instrumented application code, the first topology having hosts named in a first namespace.
3) Ingest output of agents monitoring the physical architecture on which the application code is executing, the output including metrics and parameters of the hosts in the second namespace.
4) Form a second topology of a physical architecture based on the ingested output of the agents the first topology having hosts named in a second namespace.
5) Associate the hosts in the first namespace with the hosts in the second namespace based on parameters reported by the instrumented application code and based on parameters from the agents, wherein the ingested parameters do not include a unique identifier of the hosts that match across the topologies.
4) Store the association.
5) Receive a request to view at least part of the first or second topology.
6) Send an augmented view of the requested topology with cross-topology information, e.g., a user interface to navigate between topologies or metrics from the other topology.

Some embodiments may implement the above techniques and other approaches in an example computing environment 10 shown in FIG. 1. Some embodiments include a cross-namespace host mapper 12 configured to infer (or otherwise determine) which hosts referenced by an application performance monitoring application correspond to which hosts referenced by an infrastructure monitoring application. Based on inferred mappings, some embodiments may correlate metrics, events, and attributes from one of these applications with metrics, events, or attributes from the other of these applications. These correlations are expected to facilitate faster diagnoses of problems arising in complex distributed applications and allow for even more complex arrangements of distributed applications than were previously feasible to manage. Improved diagnoses, faster responses to emerging problems, and greater complexity of the distributed applications are expected to result in improved functioning of these distributed applications as industry makes use of the management and monitoring tools described herein. Embodiments are not limited to those that provide all of these benefits, though, as various engineering and cost trade-offs are envisioned, and some advantages may be pursued at the expense of others, including other advantages described below or that will be apparent to a reader of ordinary skill in the art, which is not to suggest that any other feature described herein is not also amenable to variation.

In some embodiments, the computing environment 10 is a distributed computing environment including a relatively large number of computing devices, for instance, deployed over several data centers or enterprise local area networks. In many cases, the number of computing devices with which the computing environment 10 is implemented is expected to exceed 10, and in many commercially relevant use cases, 100, or 1,000.

In this example, the computing environment 10 includes a cross-namespace mapping repository 14, an infrastructure monitor 16, an application monitor 18, a plurality of monitored computing devices 20, 22, and 24 executing a monitored distributed application, and a network 26, such as the Internet or various other intermediary networks, like local area networks.

Three computing devices 20, 22, and 24 are shown, but embodiments are expected to typically include many more, for instance, numbering in the dozens, hundreds, or thousands or more. In some embodiments, the computing devices 20, 22, and 24 may be rack-mounted computing devices in a data center, for instance, in a public or private cloud data center. In some embodiments, the computing devices 20, 22, and 24 may be geographically remote from one another, for instance, in different data centers, and geographically remote from the other components 12, 14, 16, and 18, or these components may be collocated.

In some embodiments, the network 26 includes the public Internet and a plurality of different local area networks, for instance, each within a different respective data center connecting to a plurality of the computing devices 20 through 24. In some cases, the various components may connect to one another through the public Internet via an encrypted channel. In some cases, a data center may include an in-band network through which the data operated upon by the application is exchanged and an out-of-band network through which infrastructure monitoring data is exchanged. Or some embodiments may consolidate these networks.

In some embodiments, each of the computing devices 20 through 24 may execute a variety of different routines specified by installed software, which may include application software, monitoring software, and an operating system. Application software, in this context, serves a different purpose from monitoring software. The application software generally executes in service of a business function or other workload for which the computing environment 10 was provisioned by a user. In contrast, the monitoring software monitors, and in some cases manages, the operation of the application software or the computing devices upon which the application software is executed. Thus, the application software does not require the monitoring software to serve its purpose, but with the complexity of modern application software and infrastructure, often the monitoring software makes deployments much more manageable and easy to improve upon.

In some cases, the application software is a distributed application, meaning that different components of the application software execute on different hosts, for instance, on different computing devices, in different virtual machines, in different containers, or in different operating systems having different memory address spaces. In some embodiments, each computing device may have a single host, or a given computing device may have multiple hosts, for instance, in the case of a computing device executing multiple virtual machines, each having a virtual machine operating system and executing within an operating system of the computing device. In some cases, each host may have a different network layer host address. A "host" need not be labeled as a host in program code or data structures to constitute a host, e.g., often hosts may be labeled as "servers" or "guests."

In many cases, the application software is implemented with different application components 30 executing on the different hosts. In some cases, the different application components may communicate with one another via network messaging, for instance, via a local area network, the Internet, or a loopback network address on a given computing device. In some embodiments, the application components communicate with one another via respective application program interfaces, such as representational state transfer (REST) interfaces, for instance, in a microservices architecture. In some embodiments, each application component includes a plurality of routines, for instance, functions, methods, executables, or the like, in some cases configured to call one another. In some cases, the application components are configured to call other application components executing on other hosts, such as on other computing devices, for instance, with application program interface request including a command and parameters of the command. In some cases, some of the application components 30 may be identical to other application components on other hosts, for instance, those provided for load balancing purposes in order to concurrently service transactions. In some cases, some of the application components may be distinct from one another and serve different purposes, for instance, in different stages of a pipeline in which a transaction is processed by the distributed application. An example includes a web server that receives a request, a controller that composes a query to a database based on the request, a database that services the query and provides a query result, and a view generator that composes instructions for a web browser to render a display responsive to the request to the web server. Often, pipelines in commercial implementations are substantially more complex, for instance, including more than 10 or more than 20 stages, often with load-balancing at the various stages including more than 5 or more than 10 instances configured to service transactions at any given stage. Or some embodiments have a hub-and-spoke architecture, rather than a pipeline, or a combination thereof. In some cases, multiple software applications may be distributed across the same collection of computing devices, in some cases sharing some of the same instances of application components, and in some cases having distinct application components that are unshared.

With the complexity that can arise in distributed applications, it can be difficult to diagnose application performance issues or infrastructure issues. Accordingly, some embodiments include monitoring software. The monitoring software is of two distinct types that, while they both perform monitoring, perform functions recognized as in industry as being in distinct product categories traditionally: infrastructure monitoring, and application performance monitoring. The former can be analogized to the diagnostic software used by an automotive mechanic to monitor a car's engine, while the latter can be analogized to GPS navigation software by which a car's direction and speed is tracked. Both relate to the operation of the car, but they are distinct categories of software. A similar relationship exists for application performance monitoring and infrastructure monitoring applications.

In some embodiments, the infrastructure monitoring software may be a distributed infrastructure management application that includes the infrastructure monitor 16 and infrastructure agents 28 installed on the computing devices 20 through 24. In some embodiments, the infrastructure agent may be installed on networking equipment as well, for instance, on switches and routers. Or some embodiments are partially or entirely agentless, and metrics, events, and attributes may be gathered with the various protocols described below for this purpose.

In some embodiments, the infrastructure agent is configured to gather attributes of the computing host upon which the infrastructure agent executes, such as a host name (or other type of host identifier), a network address, a medium access control address, a domain name service, a data center identifier, a data center region, a processor model, a processor speed, amounts of processor memory of various types of cache (e.g. L1 and L2), an operating system name, an operating system version, operating system configurations, firmware names, firmware versions, driver names, driver versions, installed application names, installed application versions, amounts of memory available in random access memory, memory speed, amounts of persistent storage available, persistent storage speed, and the like. In some embodiments, the infrastructure agent is configured to gather metrics of the host upon which the infrastructure agent executes, for instance, processor utilization, memory utilization, temperature, network bandwidth, network latency, rates of packet loss on networks, and the like. In some embodiments, the infrastructure agent is configured to gather events, such as alarms, indicative of occurrences at the host upon which the infrastructure agent executes, for instance, instances of the above metrics crossing (or changing faster than) a threshold, operating system errors, crashes, reboots, corrupted memory being detected, and the like.

In some embodiments, the infrastructure agent may be configured to report such gathered information to the infrastructure monitor 16, for instance, periodically, and buffer the information between reports. In some embodiments, the infrastructure agent may be configured to receive requests for such information from the infrastructure monitor 16 and respond with responsive information, for instance, all information buffered, or information responsive to a query from the infrastructure monitor 16.

In some embodiments, the infrastructure agent 28 may include a plurality of "probes," which may be routines configured to gather information pertaining to a particular use case for the host, for example, probes configured to gather information about databases, email servers, web servers, and the like. In some embodiments, some infrastructure agents may have a plurality of probes and a different infrastructure agents may have different pluralities of probes. Or in other architectures consistent with the present techniques, each "probe" may be characterized as an agent, e.g., a single host may have multiple specialized infrastructure or application performance monitoring agents.

In some use cases, system administrators do not have a way to easily take inventory of the computing devices upon which a given distributed application or plurality of distributed applications execute. Often computing devices or hosts executing thereon, are added and removed relatively frequently, often over diverse geographic areas, in some cases automatically responsive to changes in the applied load or crashes or maintenance elsewhere in the system. To ease this burden, some embodiments of the infrastructure monitor 16 are configured to automatically discover newly added hosts within a domain, for instance, new virtual machines that were added or new computing devices that were added. In some cases, the infrastructure monitor 16 may periodically, or in response to a command, scan a range of network addresses, like in a private subnet, with request sent according to various network management protocols, like Simple Network Management Protocol (SNMP), Secure Shell (SSH), Windows Management Instrumentation (WMI), or Internet Control Message Protocol (ICMP). If a computing device is not at a given address in the range, no response may be received within a threshold duration of time, and that address may be disregarded. In contrast, a new computing device or other host at a given address, upon receiving the network management protocol request may respond to the request, indicating the presence of a host. Upon detecting a new host, some embodiments of the infrastructure monitor 16 may direct the host to install an instance of the infrastructure agent and, in some cases, configure various probes thereon based upon a role indicated by the host.

In some embodiments, the infrastructure monitor 16 may receive information reported from the infrastructure agents and generate various dashboards, reports, and alarms based on this information. In some embodiments, the infrastructure monitor 16 is further configured to automatically take remedial action, for instance, provisioning additional computing devices responsive to thresholds being exceeded, like thresholds indicating CPU or memory usage greater than a threshold amount. In some embodiments, the infrastructure monitor 16 may organize the received information according to an identifier of a host upon which the infrastructure agent reporting the information is executing. Based upon discovered hosts, and in some cases information reported by those hosts, some embodiments of the infrastructure monitor 16 may construct a network-architecture topology of a physical architecture of computing devices within a domain. In some cases, this network-architecture topology may include network-architecture host identifiers for each of the hosts that were discovered or otherwise identified (for instance, manually identified and configured by a system administrator). In some cases, these host identifiers may be specified by a system administrator, or in some cases, the host itself.

Reported host names (i.e., names observed and reported by a particular application) are often different across different monitoring applications for a variety of reasons. Reported host names can be generated automatically when the host is created. Host names can be defined by an administrator of that host. Reported host names can be supplied an alias name, which is an alternative to (and when reported as such, a type of) a host name. Host names can have multiple versions of a name, such as a fully-qualified domain name (FQDN) as opposed to a host name in a narrower sense. These names may be the same across monitoring applications in some cases, but in others, they differ. Variation in host names may arise when the agents obtain the host name. The different agents may use different methods or APIs (e.g., of the operating system in which they execute) to obtain the host name. This can result in a different answer to the same API host-name request for the same host. One agent may know one version of the host name, while the other has a FQDN. In some cases, this problem is further complicated when a host can have a plurality of other characteristic identifiers such as IP or MAC addresses. Each agent may determine (e.g., by querying an API of the operating system) one or more IP addresses and MAC address, but they may not identify all of them. This is further complicated when multiple applications running on a given host, are informed (e.g., by an API of the operating system in which the applications execute) that they have two separate IP addresses (e.g., one application is given presented with one IP address, and another application is presented with a different IP address), even when those IP addresses are on the same host. By way of analogy, one can ask two people to provide a description of the same person. One says the person is "Tall with brown hair and a red shirt", the second says the person is "Female with a long hair, and a bright red shirt". It is not apparent that these descriptions are of the same person, even though that may be the case. Similarly, host names or IP addresses are often not enough to definitively identify a host. Both can be duplicates, particularly in cases where private IP ranges are used, e.g., on commonly deployed private subnets. In some cases, it is possible for a host to have multiple IP addresses, only some of which are known externally. All these corner cases can make it difficult to correctly diagnose problems and establish the relationship between a problem and the location of the root-cause in a computing environment monitored with different types of monitoring applications.

In some embodiments, the network-architecture topology also includes information indicative of the relative location of the hosts within a network, for instance, which hosts are on the same subnet, which hosts communicate with one another, or which hosts are within a given geographic region or data center. Some embodiments may gather all of this information in the network-architecture topology or just a subset.

In some embodiments, as discussed above, the monitoring software further includes application performance management software. For example, some embodiments may include a distributed application performance management application including the application monitor 18 and an application agent 32 (or plurality of application agents) executing on the computing devices 20 through 24. In some embodiments, the application agents may be configured to monitor performance of the application component 30. Monitoring performance may take a number of forms, and examples include measuring response times of various routines of the application component 30, for instance, durations of times elapsed between when a given routine is called and when the given routine returns a response. Other examples include gathering errors thrown by routines. In some embodiments, routines may be instrumented by adding calls to the application agent at the beginning and ends of the routines, such that the application agent receives a signal when a given routine in a given execution instance begins and ends, and the application agent may determine response times based on the signals by subtracting the time at which the begin signal was received from the time at which the end signal was received. In some embodiments, these routines may receive such signals from an operating system of a host. In some cases, the application agent and application component may be configured before both are installed on a computing device. For instance, code for the application component may be instrumented with calls to the application agent before that code is installed in a machine image or the computing device 20-24 that receives that machine image.

In some embodiments, the application agent 32 may gather attributes, metrics, and events of application components and report that gathered information to the application monitor 18, for instance, buffering the information and sending it periodically or sending the information responsive to queries. In some embodiments, the application monitor 18 may aggregate information gathered from a plurality of application agents executing on the computing devices 20 through 24 for a given distributed application and generate various dashboards, reports, and alarms. In some embodiments, the application monitor 18 may be configured to group reported metrics according to a given transaction serviced by the distributed application. For instance, a given website request and the chain of events in a pipeline by which the given website request is serviced is an example of a transaction. In many cases, the distributed application may service a relatively large number of transactions concurrently, for instance, after a relatively large number of users make requests at around the same time. Some embodiments may be configured to, for a given transaction, determine a total response time for the transaction, for instance, as perceived by a user, indicating a difference in time between when a request was received and when a response was provided for a user. Further, some embodiments may be configured to segment that response time for the transaction according to the contribution of each of the application components and routines therein. The various reports analyses, and dashboards described herein may be formed by instructing a computing device to render a graphical user interface depicting the same, for instance, by sending instructions to a web browser on a remote computing device or instructing a display of a computing device upon which the respective monitor 16 or 18 is executing. Thus, in some cases, a developer may be able to query the application monitor 18 for particularly slow transactions (or transactions for which an error occurred) and drill down into the particular application component and routine that contributed to the slow response or error.

In some cases, the application monitor 18 may form a logical-architecture topology based on information reported by the various application agents 32. For example, the logical-architecture topology may include some or all of a call graph of the distributed application. In some cases, the call graph may indicate which application components call which other application components, and in some cases which routines therein call which other routines. In some cases, the logical-architecture topology, either in the form of a call graph or a less granular representation (for instance organized according to host), may include identifiers of the hosts upon which the application components execute. In some cases, these identifiers are logical-architecture host identifiers as reported by the application agents 32. The logical-architecture host identifiers may be obtained by the techniques described above. In some cases, the host identifiers obtained by the application monitor is the host name returned by the Java™ getHostName( ) API. This interface often suffers from the host-name-ambiguity corner cases discussed above (e.g., there are a number of perspectives for observing a host, and each may report a different name). In another example, a request to www.company-X.com (which is a type of a "host name" with an address) often is re-routed by a number of components in the infrastructure to a host that knows itself by a completely different name and address than the publicly available one. Yet, these various names and addresses refer to the exact same entity. Thus, the logical-architecture host identifiers may have a different namespace from that of the network-architecture host identifiers, and the same host may be referred to by different strings in these different namespaces (though portions of the namespaces may overlap in some cases). As a result, as discussed above, in many cases, it can be difficult to correlate between information gathered by infrastructure agents and information gathered by the application agents.

In some embodiments, the cross-namespace host mapper 12 is configured to populate the cross-namespace mapping 14 with records that translate between these namespaces by inferring which logical-architecture host identifiers and network-architecture host identifiers refer to the same host. In some cases, this inference may be based on parameters reported by the respective agents 28 and 32 or based on values associated with hosts when configuring monitors 16 or 18.

In some embodiments, some or all of the inference may be based on terms in a string serving as a host name. For example, some embodiments may determine whether logical-architecture host identifiers and network-architecture host identifiers are within a threshold edit distance of one another and deem those within the threshold edit distance as matching, or referring to the same host (and deem those outside the edit distance as not matching). Some embodiments may match a prefix or suffix in one string to another portion of another string across the two host identifiers (and determine a match or lack of match based on this comparison). In some cases, the edit distance is a Levenshtein distance. The edit distance may be a value indicative of a number of deletions or substitutions in a given string that make that given string identical to another string. Some embodiments may parse one string according to a delimiter (like a ".", or a space) and determine whether parsed segments match a portion of the other string corresponding to one of the identifiers. In some cases, matches may be determined based on one of these tests or based on a combination of these tests.

In some embodiments, some or all the inference may be based upon the attributes gathered by the respective agents 28 and 32. For instance, some embodiments may match based on both correspondence between the host names in the two namespaces (of the various forms described in the preceding paragraph) and a network domain. For instance, within one of the namespaces, a given string may be used to refer to multiple posts on different network domains, but some embodiments may combine both the host and network domain to generate a unique match across the namespaces.

In some embodiments, a given computing device may have multiple hosts, so in some cases, attributes of the physical hardware of the computing device may not serve to fully disambiguate between potential matches between the namespaces. Some embodiments may group within each of the namespaces host names according to attributes of the physical hardware of the computing devices and, then, match according to the above techniques within each of the groups.

In some embodiments, host identity depends on the environment (e.g., VMware™, Docker™, IP subnet, etc.) and each infrastructure agent "understands" identity in the environment that it monitors. Some embodiments may exploit the overlap in identity markers to determine, using various heuristics, when agents are observing the same host. This allows some embodiments to determine, for example, that a virtual machine known by a string of characters in VMWare™ is the same as the hostname in a DNS (Domain Name System), because in the subnet corresponding to its IP address, the MAC address of the virtual machine matches the MAC address of the virtual machine (with that name), as assigned by VMware™. A similar analysis can be made for Docker™ containers and externally visible Docker™ containers. Moreover, some embodiments may infer that the physical hypervisor host in which a virtual machine is running is also (transitively) hosting a Docker™ container. In other embodiments, the mapping may be achieved through agent-to-agent communication. For instance, some embodiments may designate a given port of the host for agent-to-agent communication, and in some cases, the infrastructure agent may send a message to an application agent via a loopback Internet protocol address and this port, for instance with a unique identifier of the infrastructure agent 28 among all of the infrastructure agents, and the application agent 32 may send this unique identifier to the application monitor 18 which may then correlate via a communication with the infrastructure monitor 16. In some cases, though, legacy deployments may not support this feature, or some companies may implement a security policy that prevents communication between an in-band network and an out-of-band network.

The resulting mappings may be stored (e.g., in program state in dynamic memory or in persistent storage, like in a file committed to disc) in the cross-namespace mapping 14. In some cases, the cross-namespace mapping may include a plurality of records, each record linking a given network-architecture host identifier with one or more logical-architecture host identifiers. In some cases, the logical architecture may be denoted with greater granularity, for instance, treating different containers as different hosts, so the same network-architecture host identifier may link to multiple logical-architecture host identifiers. Or in some embodiments, the mapping may be one to one, with a single network-architecture host identifier uniquely matched to a single logical-architecture host identifier.

In some embodiments, this mapping may be used to correlate between information reported by these two types of monitoring applications. For instance, some embodiments may form a user interface described below with reference to FIG. 3 by which a developer may navigate through a logical-architecture topology to select a given host and then view infrastructure monitoring information linked to that host via the mapping. Similarly, in some embodiments, a user interface may be generated to depict a network-architecture topology, and a system administrator may select a given host on the network-architecture topology and view application performance monitoring information relating to one or more of a plurality of application components executing on that host. In other examples, some embodiments may generate a graphical user interface depicting a collection of alarms or other events obtained with one type of monitoring application, and upon a user selecting one of those events, the user may be presented in the graphical user interface with information gathered from the other type of monitoring application, thereby facilitating efforts to diagnose problems. It should be noted, though, that the correlations may be used for other purposes, for instance, for detecting security breaches, automatically provisioning additional computing resources, and the like.

Figure 2:
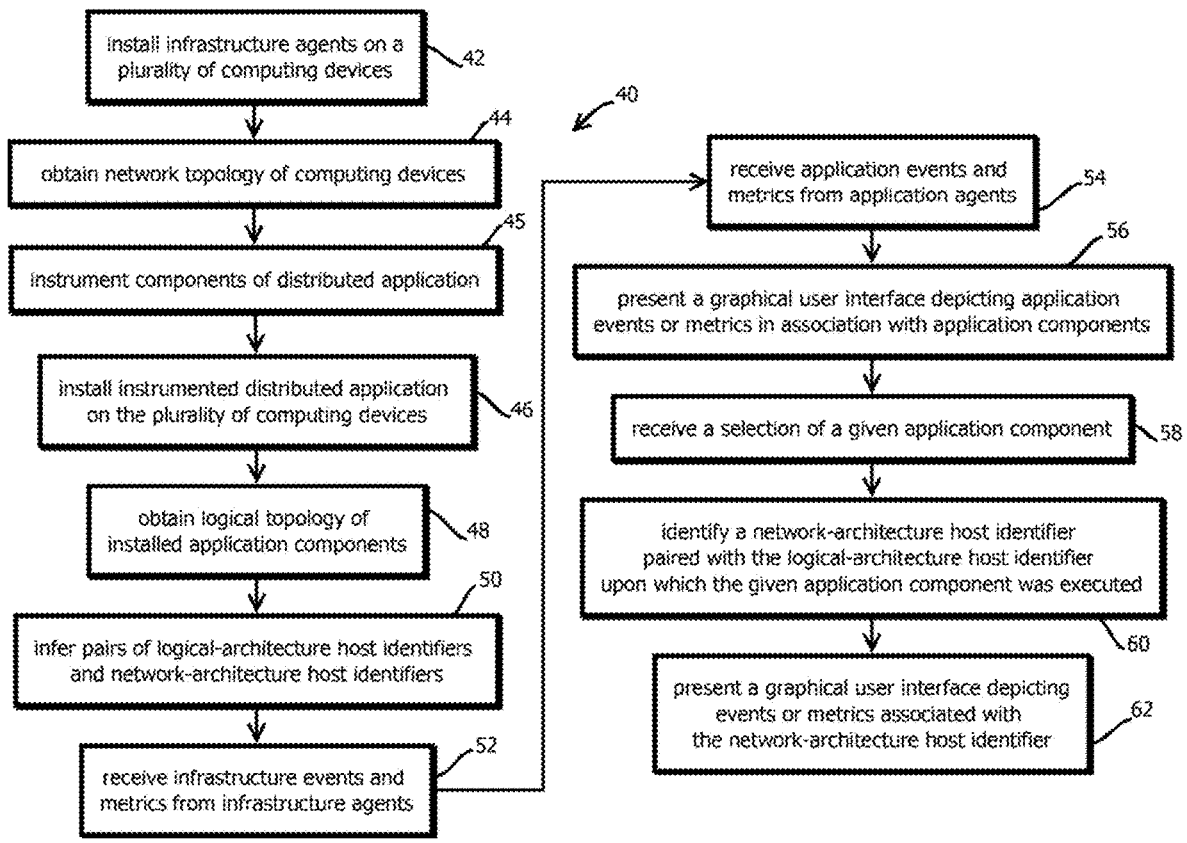
FIG. 2 is a flow chart of a process performed by some embodiments of the cross-namespace mapper of FIG. 1.

In some embodiments, the computing environment 10 may execute a process 40 shown in FIG. 2 in order to monitor infrastructure and applications and correlate information between these two types of monitoring. In some embodiments, the process 40 includes installing infrastructure agents on a plurality of computing devices, as indicated by block 42, and obtaining a network topology of the computing devices, as indicated by block 44. Next, some embodiments may instrument components of a distributed application, as indicated by block 45, and then, install the instrumented distributed application on the plurality of computing devices, as indicated by block 46. In some cases, the application agents may be installed as part of this process, for instance, before or after installation on the computing devices. Next, some embodiments may obtain a logical topology of the installed application components, as indicated by block 48, for instance, based on information reported by the application agents. Some embodiments may then infer pairs of logical-architecture host identifiers and network-architecture host identifiers, as indicated by block 50, for instance, with the techniques described above. Some embodiments may then receive infrastructure of events and metrics from infrastructure agents, as indicated by block 52, and receive application events and metrics from application agents, as indicated by block 54.

Some embodiments may present a graphical user interface depicting application events or metrics in association with application components, as indicated by block 56. This may be performed by instructing a local graphical interface on the same computing system performing block 54 to generate the graphical user interface or forming and sending instructions that cause another computing device to render the graphical user interface, for instance by sending a webpage that is rendered in a browser on a remote computing device.

Next, some embodiments may receive a selection of a given application component, as indicated by block 58, and identify a network-architecture host identifier paired with the logical-architecture host identifier upon which the application component was executed, as indicated by block 60. The selection may take a variety of different forms, including an explicit selection of the application component or a selection of a record linking to the application component, like an event emitted by the application component or a host identifier of a host upon which the application component was executed. In some cases, the identification of the pairing may be performed by accessing the cross-namespace mapping 14 described above with a query listing a host identifier in one namespace and receiving a responsive host identifier in a different namespace.

Next, some embodiments may present a graphical user interface detecting events or metrics associated with a network-architecture host identifier, as indicated by block 62. Again, presenting may take various forms, including local presentation and sending instructions that cause remote presentation. In some embodiments, the mapping may be accessed in the opposite direction, for instance, by receiving a user selection indicating an identifier in the network-architecture namespace, accessing the cross-namespace mapping to identify a logical-architecture host identifier referring to the same host, and then retrieving and presenting events or metrics associated with the application component executing on that host.

In some embodiments, identifying the network-architecture host identifier paired with the logical-architecture host of identifier may be performed before block 56. For example, some embodiments may index records having a host identifier in one namespace to add an additional column indicating the host identifier in another namespace, for instance, as part of a batch process performed hourly or weekly.

Figure 3:
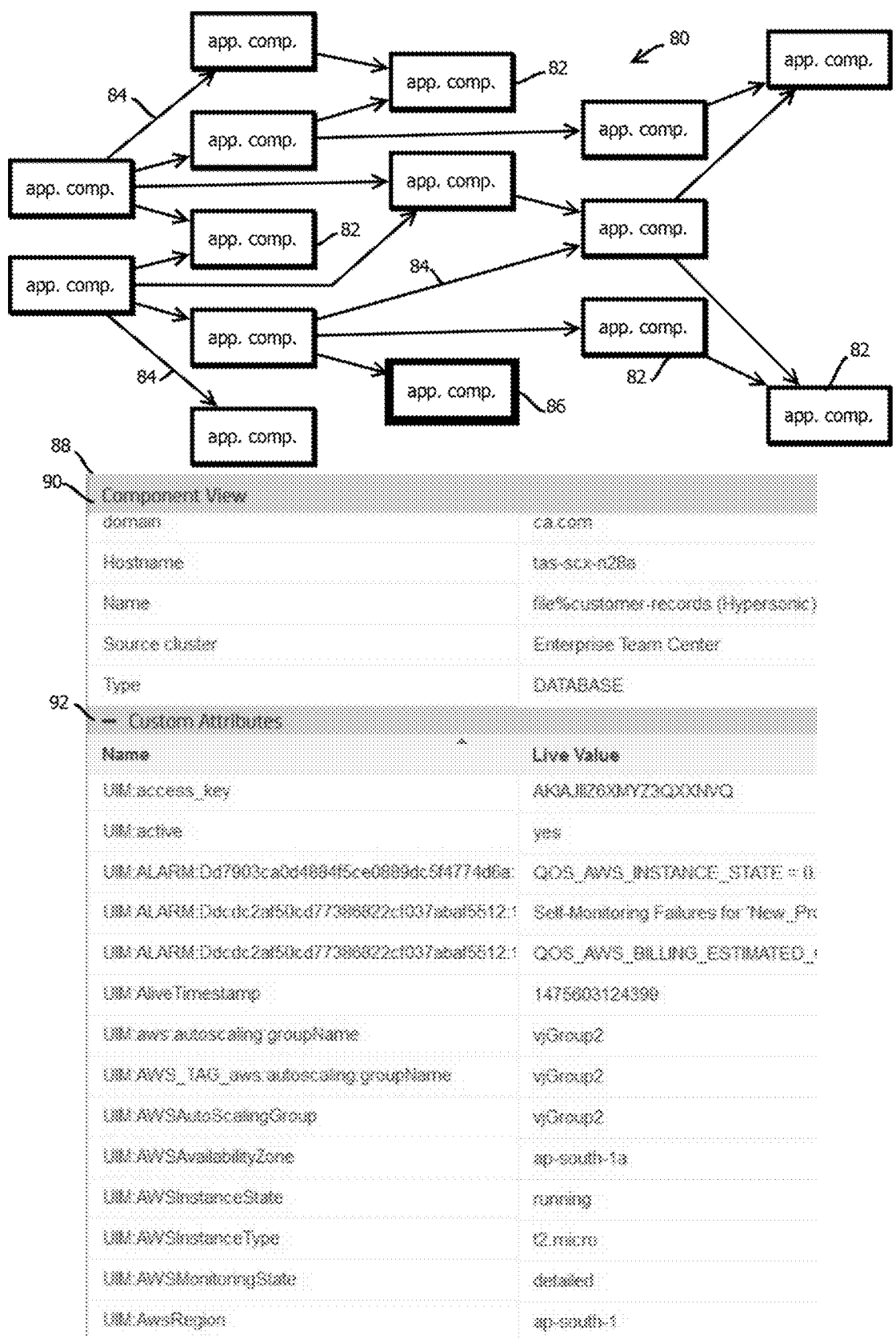
FIG. 3 is an example of a user interface based on a cross-namespace mapping in accordance with some embodiments.

FIG. 3 shows an example of a user interface produced with some of the above techniques. In some embodiments, the user interface includes a logical-architecture topology 80 and a table 88 listing metrics and alarms. In some embodiments, the logical-architecture topology 80 may be depicted as a graph, with a plurality of application components 82 and edges 84 indicating calls from one application component to another. Upon a user selecting a given application component 86 in this example, the table 88 may be updated to include both a sub-table 90 with information about the host of the selected application component as reported by the application agent monitoring that application component 86 and a sub-table 92 including information about the same host as reported by the infrastructure agent. In some embodiments, a developer attempting to troubleshoot why application component 86 emitted a given alarm, or slowed a given transaction, may determine based on sub-table 92 that the application component 86 is executing in a given geographic availability zone of a public cloud that was known to have had a failure at the time the transaction at issue was processed, thereby indicating a cause of the problem. In some embodiments, the sub-table 92 may include time-stamped information having the same timestamped or within a threshold duration of a timestamp of timestamped information sub-table 90, thereby correlating across both time and host.

In summary, in many application performance monitoring and infrastructure monitoring applications, analysts can associate problems with a host within that application. Infrastructure monitoring often tracks events and alarms to a computer system, through the devices that constitute the computer system (as observed by agents and in some cases their probes). But many existing monitoring applications do not associate events from infrastructure monitoring with impacts on applications monitored by application performance monitoring. With some embodiments of the present techniques, an analyst can make this association and, for example, know both that disk IO is impacting a computer system (e.g., host or server) and that the poor performance that is being experienced by the end-user of the application monitored by application performance monitoring is likely due to the disk IO issues. Without the topology tie between application performance monitoring and infrastructure monitoring applications, it is difficult or impossible to make this inference. That said, not all embodiments provide these benefits, as several independently useful techniques are described (such as those that follow), which is not to suggest that any other feature may not also vary in other embodiments.

As noted, monitoring applications often report various events, such as alarms. Often, the alarms are often not correlated to a host in infrastructure monitoring applications. Analysts often have to research the alarm to find this information, and this research is often time consuming and expensive. Often, the alarm merely has a "device ID," which might be a container, a virtual machine, or a non-virtual machine (which might have several virtual machine's executing thereon or several containers). Thus, it is difficult to match an alarm to a host in some monitoring applications. Generally, industry has developed extensive tooling to abstract away the hardware, and those troubleshooting (or otherwise analyzing) performance of distributed applications often need to cut through those abstractions in ways that are not supported by many existing monitoring tools.

To mitigate this and other problems, some embodiments use a plurality of attributes associated with the "device ID" to match the alarm's device identifier to a host in a monitoring application, such as one of the monitoring applications described above. Then, using that host, some embodiments use the cross-namespace mapping to match to a host in another type of monitoring application. In some cases, this may include the following operations:

1) Receive an alarm having a device ID
2) Obtain attributes of a computing entity (e.g., container, virtual machine, or computing device) associated with the device ID, the attributes not including a unique identifier of the device in a namespace of an infrastructure monitoring application.
3) Associating the device ID with a host in an infrastructure monitoring application based on the attributes.
4) Sending a user interface to an analyst's computing device that associates the alarm with the host.
5) Associating the host in the infrastructure management system with a host in an application performance monitoring system.
6) Sending a user interface to the analyst's computing device that associates the alarm with the host in the application performance monitoring system.

As discussed above, the computing environment 10 may include application performance and infrastructure monitoring applications configured to monitor a variety of different computational entities. In some cases, these entities may be nested, for instance, behind various layers of abstraction, such as virtual machines, operating systems, containers, and the like. Generally, at a lowest level of these nested entities there is a computing device (or component thereof in some cases), which may be identified in the computing environment 10 by a unique device identifier. On that computing device may be a number of hosts, such as a host corresponding to an operating system executing on the computing device and another host corresponding to a virtual machine executing within that operating system and providing a virtualized operating system. Other examples include a container executed within the base operating system or the virtualized operating system. In some cases, a given operating system instance (either virtualized or non-virtualized) may include a plurality of hosts. Code is said to be executed by a host when that code has access in its operating system (e.g., via a driver by direct memory access transfers between a network interface buffer and system memory) to a network interface corresponding to the host.

Often crossing these layers of abstraction is challenging. For example, it can be difficult to determine the computing device upon which a given instance of an operating system, virtual machine, or container is executing or vice versa. This can present challenges when application performance or infrastructure attributes, events, or metrics are tied to one of these types of computational entities by a reporting agent, but troubleshooting or diagnostic activities implicate other computational entities in a nested relationship. For example, a developer may notice a particularly slow instance of a routine being executed in service of a transaction and wish to determine events or metrics or attributes of a device upon which the routine was executed, for instance, is CPU load, available memory, or network usage. With many traditional systems, it can be difficult for the user to correlate events or metrics reported by an infrastructure agent with events or metrics reported by an application agent.

Figure 4:
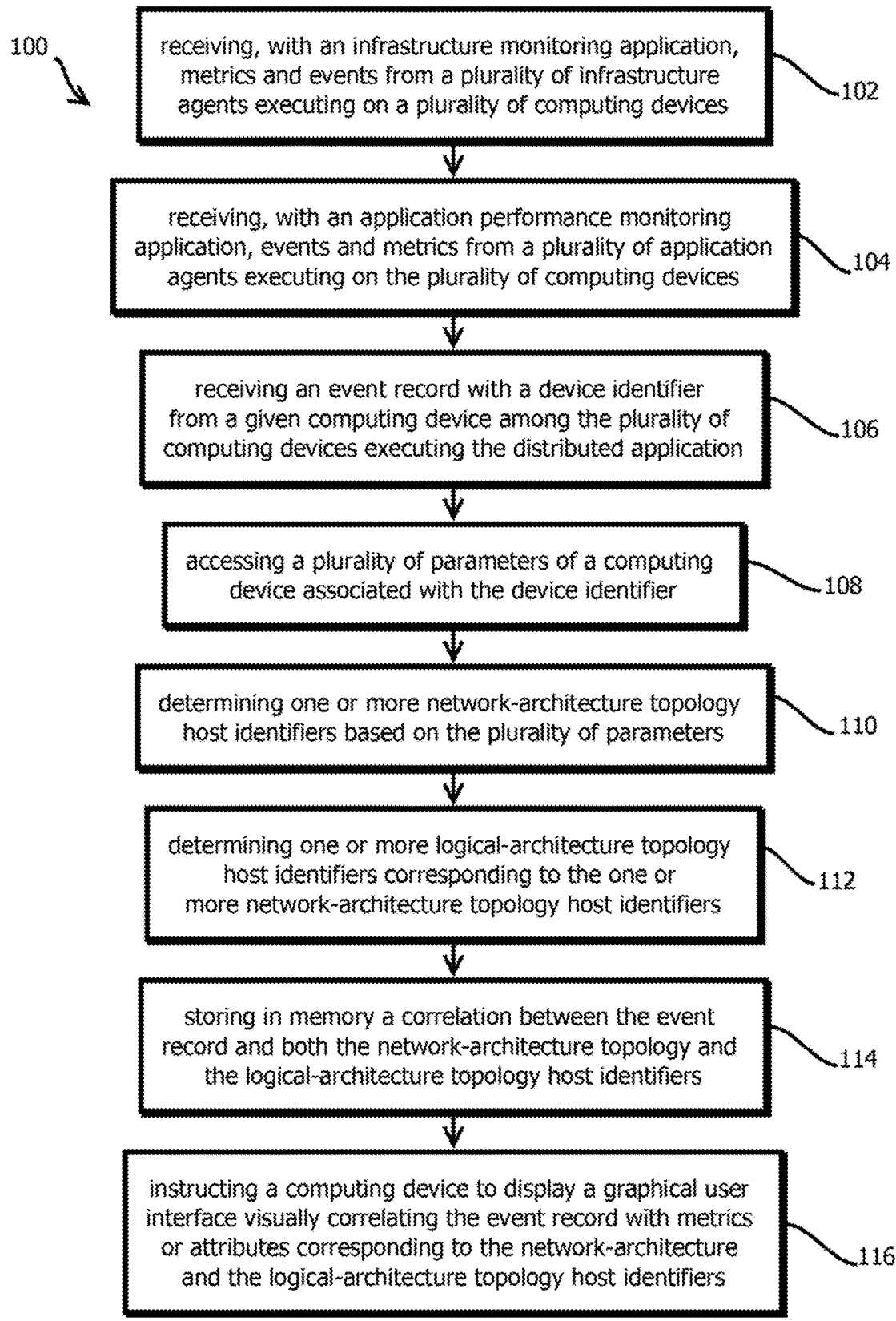
FIG. 4 is an example of a process to prepare a graphical user interface in accordance with some embodiments.

These issues and others may be mitigated by some embodiments of a process 100 shown in FIG. 4, which may be executed by the components of the computing environment 10 described above, but are not limited to that implementation (which is not to imply that any other feature is limited to the example described).

In some embodiments, the process 100 includes receiving, with an infrastructure monitoring application, metrics and events from a plurality of infrastructure agents executing on a plurality of computing devices, as indicated by block 102. In some cases, this operation may be performed by the above-described infrastructure monitor through communication with the above-described infrastructure agents.

Some embodiments include receiving, with an application performance monitoring application, events and metrics from a plurality of application agents executing on the plurality of computing devices, as indicated by block 104. In some embodiments, this operation may be performed by the above-described application performance monitor through communication with the above-described application agents. In some embodiments, the operations of block 102 and block 104 may be performed concurrently (which is not to imply that other operations may not also be performed concurrently), in some cases over a duration of time, like minutes, hours, or weeks, to populate a database of performance monitoring and infrastructure monitoring information.

Some embodiments include receiving an event record with a device identifier from a given computing device among the plurality of computing devices executing the distributed application, as indicated by block 106. In some cases, the event may be an alarm emitted by an infrastructure agent, such as an alarm indicating that CPU usage exceeded a threshold, that available memory has dropped below a threshold, or that network bandwidth usage has exceeded a threshold. The event may be an alarm indicating an operating system error or application error. The event record may be received from an infrastructure agent in some cases. Or in some cases, the event record may be emitted by a computing device or host thereon that is agentless from an infrastructure perspective (e.g., having thereon an application agent but no infrastructure agent), for instance, via one of the above-describe network monitoring protocols.

In some embodiments, the event record includes a device identifier. The device identifier may be assigned to a computing device or obtained from a computing device with a variety of techniques. For example, in some embodiments, probes (or other components of agents, such as components configured to monitor a particular type of application, usage, or performance, or agents themselves) may generate or otherwise assign their own device identifiers. For instance, some probes may compute a hash function of the agent or host identifier, probe identifier or name, and some unique attribute(s) of the device that is being monitored, e.g., by appending these strings and calculating an MD5 value, SHA-256 value, or the like on the resulting combined string. The device identifier may be (or be based on) a host name, IP address, MAC address, or some other unique identifier. By including the agent (e.g., robot) or host identifier and probe identifier in the hash calculation, it makes it more likely that a probe's generated device identifier is unique across the monitoring environment even if the same computing device is being monitored by another probe on the same host or monitored by the same probe on a different host within the same monitoring application. Further, likely unique names may be generated without a central authority coordinating a name space, thereby simplifying design and making the system more robust to failure of a single component like a central authority. That said, not all embodiments afford these benefits, which is not to suggest that other features herein are not also amenable to variation. Thus, in some embodiments, device identifiers associated with communications with agents may vary within a computing device, within a virtual machine, within a container, and in some cases within an agent, e.g., across different probes of the agent.

In some embodiments, the event record is received without being correlated with a host in a network-architecture topology or in an application's logical-architecture topology. For instance, the device identifier may not indicate which hosts are executing on the computing device corresponding to the device identifier. In some cases, the device identifier may be associated with some of the hosts but not all of the hosts, or in some cases, the device identifier may be associated with all of the host identifiers in the network-architecture topology on the computing device but a subset or none of the logical-architecture topology hosts on the computing device.

As a result, in many cases, it can be difficult to correlate the event record with the information gathered in operations 102 and 104. In many cases, the infrastructure agents and application agents report events and metrics (and attributes of the host) in association with host identifiers in the respective namespaces, but without including device identifiers. In some cases, it can be difficult for such agents to access reliable device identifiers, particularly in deeply nested computational entities that abstract away details of the underlying computing substrate. Similar issues may arise when metrics or attributes are reported in association with a device identifier, but without including a host identifier.

To mitigate these issues, some embodiments may infer host identifiers in one or more of the above-described namespaces corresponding to the received device identifier. In some cases, this may include accessing a plurality of parameters of a computing device associated with the device identifier, as indicated by block 108. For instance, the device identifier may uniquely identify, among the plurality of computing devices, a given computing device, and some embodiments may access a record of attributes of that computing device or other types of parameters. In some cases, the parameters include a primary domain name service of the given computing device, a domain name service entry of the given computing device, an Internet protocol address of the given computing device, or a medium access control address of the given computing device. In some cases, all of these parameters or others may be accessed. In some embodiments, the parameters may be reported by an infrastructure agent or obtained through agentless monitoring. In some embodiments, the parameters may be previously obtained and stored in association with the device identifier, for instance, before beginning the process 100, or in some cases the parameters may be obtained upon receiving the event record. Next, some embodiments may determine one or more network-architecture topology host identifiers based on the plurality of parameters, as indicated by block 110. In some cases, these host identifiers may be associated with some or all of the same parameter values as were accessed in block 108. In some embodiments, the corresponding infrastructure agents or agentless requests may be used to obtain these parameters associated with the host identifiers. In some cases, the parameters associated with a host identifiers may be obtained in advance of the process 100 or upon receiving the event record.

Some embodiments may iterate through a list of host identifiers in the network-architecture topology and compare parameters associated with those various host identifiers with the parameters accessed in block 108 to generate a set of matching network-architecture topology host identifiers. In some cases, a single host identifier may be in the set, or in some cases a plurality of host identifiers may be in the set.

Next, some embodiments may determine one or more logical-architecture topology host identifiers corresponding to the one or more network-architecture topology host identifiers, as indicated by block 112. In some cases, these two sets of host identifiers may be identical, for instance, when the network-architecture topology and the logical-architecture topology share the same namespace. Or in some cases, these two topologies may use different namespaces for host identifiers. In this events, some embodiments may perform the operations described above with reference to FIGS. 1 and 2 in order to determine pairs of network-architecture topology host identifiers and logical-architecture topology host identifiers that refer to the same host.

Next, some embodiments may store in memory a correlation between the event record (or other metric or attribute obtained in block 106) and both the network-architecture topology and the logical-architecture topology host identifiers, as indicated in block 114. Or some embodiments may store a correlation between one of the sets of host identifiers. In some cases, the correlation may be stored in program state or committed to persistent memory. In some cases, the correlation may be a one-to-one mapping, a many-to-many mapping, or a many-to-one mapping. In some cases, the correlation is a probabilistic mapping, indicating that the event record likely corresponds to a given host identifier or a deterministic mapping, indicating that the event record corresponds with certainty.

Next, some embodiments may instruct a computing device to display a graphical user interface visually correlating the event record with metrics or attributes (or other events) corresponding to the network-architecture and the logical-architecture topology host identifiers, as indicated by block 116. In some cases, visual correlation may be indicated in a given view of the graphical user interface, for instance, by annotating an icon representing a given host, like with a different visual weight, examples including highlighting, changing color, bolding text, changing a drop shadow, changing transparency, animating movements, or the like. In some cases, visual correlation may be indicated by an interaction that drives the graphical user interface between a sequence of views, for instance, by receiving a user selection of the event record and responding with a view depicting information about, or an icon of, the identified host or hosts. In some cases, the correlation may be indirect, for instance, indicating visually a relationship between the event record and metrics, events, or attributes of the identified host, either obtained in block 102 or in block 104 or both.

For example, upon being presented with the event record in a graphical user interface, an engineer may wish to understand the effect of the event on transactions being serviced at the time the event occurred within the distributed application. In this use case, the engineer may select an icon associated with the event record requesting related application performance management metrics. In response, some embodiments may access the stored correlation from block 114 to identify logical-architecture topology host identifiers correlated with the event record. Some embodiments may then query from a database of application performance metrics response times of routines of application components executed on those hosts that were identified. Some embodiments may then also identify transactions corresponding to those instances in which the routines were performed and present a transaction trace indicating total transaction time (or other transaction events, like a failed transaction) along with the response time of the routines executing at the time the event occurred. Thus, an engineer may diagnose downstream application issues, potentially occurring on other computing devices or other hosts in one of the above-described pipelines resulting from an event on a different computing device.

Some embodiments may observe an event and determine how it may have affected a transaction. And some embodiments may make the determination in the other direction. For example, an end-user may complain about a problem. And in response, using the output of the techniques above, an analyst may follow the topology to identify events that individually, or together, may be impacting the end-user experience.

In some cases, both the logical-architecture topology and the network-architecture topology are dynamic, e.g., change during execution of the distributed application, in some cases, responsive to the various metrics and events described herein, e.g., with more than one, ten, or 100 hosts added or removed per hour, day, or week. To accommodate these changes, some embodiments may update one or both of these topologies, e.g., periodically, or in response to an event, like one of the above-described events. In some cases, the logical-architecture topology changes more frequently than the network-architecture topology, but both can change in some cases. In one example, some embodiments leverage automated orchestration to dynamically provision and modify the infrastructure to better serve the performance of the application topology. Some embodiments may have a correlation algorithm that is case sensitive to attributes.

Figure 5:
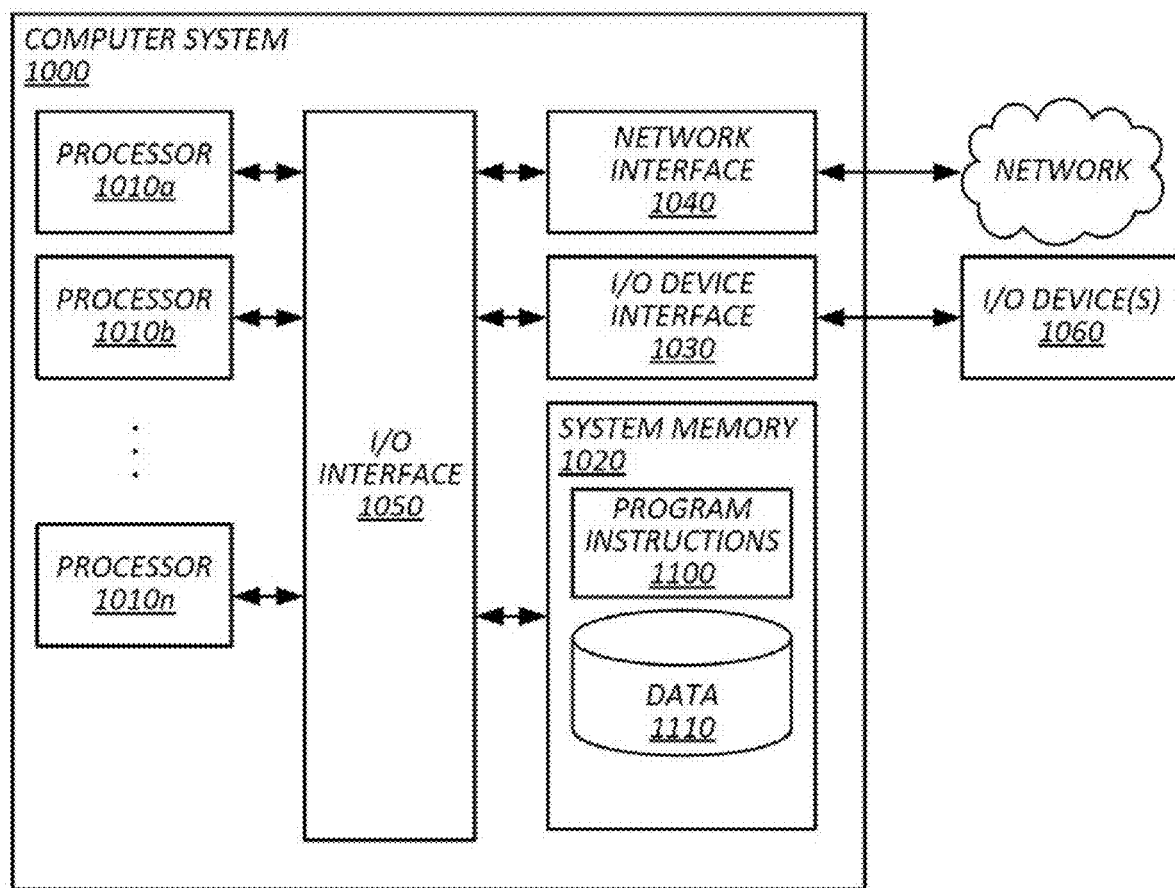
FIG. 5 is an example of a computing device by which the above techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method of correlating information organized according to a logical architecture of a distributed application to information organized according to a network architecture of computers executing the distributed application, the method comprising: obtaining a logical-architecture topology of a logical architecture of a distributed application executing on a plurality of computing devices, wherein: the logical-architecture topology comprises logical-architecture host identifiers in a logical-architecture namespace, and each logical-architecture host identifier identifies one computing device among the plurality of computing devices; obtaining a network-architecture topology of a physical architecture of the plurality of computing devices executing the distributed application, wherein: the network-architecture topology comprises network-architecture host identifiers in a network-architecture namespace, the network-architecture namespace is different from the logical-architecture namespace, and each network-architecture host identifier identifies one computing device among the plurality of computing devices; inferring pairs of logical-architecture host identifiers and network-architecture host identifiers that refer to the same computing device to produce a cross-namespace mapping that correlates the logical-architecture namespace with the network-architecture namespace, wherein inferring comprises: obtaining a first set of parameters of a computing device having a given logical-architecture host identifier, obtaining a second set of parameters of a computing device having a given network-architecture host identifier, and determining a match between the given logical-architecture host identifier and the given network-architecture host identifier based on correspondence between a plurality of the first set of parameters and a plurality of the second set of parameters; and storing the cross-namespace mapping in memory.
2. The method of embodiment 1, wherein the first set of parameters are obtained from a distributed performance monitor application configured to determine response times of each of a plurality of components of the distributed application being monitored.
3. The method of any one of embodiments 1-2, wherein the first set of parameters comprise parameters obtained by querying an operating system of the computing device having a given network-architecture host identifier for attributes of the computing device having the given network-architecture host identifier, the attributes including processor attributes, memory attributes, and networking attributes.
4. The method of any one of embodiments 1-3, wherein the second set of parameters are obtained from an infrastructure management application configured to discover the network-architecture topology and monitor the plurality of computing devices based on communications from agents executing on the plurality of computing devices.
5. The method of any one of embodiments 1-4, wherein the second set of parameters include portions of a management information base (MIB) obtained via a network connecting the plurality of computing devices with a Simple Network Management Protocol (SNMP) request to the given network-architecture host, the MIB including a hierarchical arrangement of at least some of the second parameters.
6. The method of any one of embodiments 1-5, wherein inferring pairs of logical-architecture host identifiers and network-architecture host identifiers comprises: matching based on both host name strings and domain name strings.
7. The method of any one of embodiments 1-6, wherein inferring pairs of logical-architecture host identifiers and network-architecture host identifiers comprises: matching based on rules.
8. The method of any one of embodiments 1-7, wherein inferring pairs of logical-architecture host identifiers and network-architecture host identifiers comprises: determining an edit distance between at least one parameter among the first set of parameters and at least one parameter among the second set of parameters; parsing a prefix or suffix from at least one parameter among the first set of parameters or second set of parameters and matching another string to the prefix or suffix; or parsing a substring denoted by delimiters in at least one parameter among the first set of parameters or second set of parameters and matching another string to the sub string.

9. The method of any one of embodiments 1-8, comprising: determining response times for each of a plurality of routines executed to service a transaction; for a given routine, identifying a logical-architecture host identifier in the logical-architecture topology of a computing device upon which the given routine was executed to service the transaction; accessing the mapping to identify a network-architecture host identifier in the network-architecture topology; and associating the response time of the given routine with a host in the network-architecture based on the network-architecture host identifier.

10. The method of embodiment 9, comprising: retrieving utilization metrics of the associated host in the network-architecture.

11. The method of any one of embodiments 1-10, comprising: associating infrastructure management monitoring data indexed according to the network-architecture topology with application performance data indexed according to the logical-architecture topology.

12. The method of any one of embodiments 1-11, comprising: causing a display to be presented that includes an indication of a response time of at least one of a plurality of routines executed in the course of servicing one or more transactions with the distributed applications; receiving a selection of a user interface associated with the indication of the response time; using the cross-namespace mapping to identify a network-architecture host identifier of a host upon which the at least one of the plurality of routines was executed; and causing a display to be presented that identifies the host upon which the at least one of the plurality of routines was executed in the context of the network-architecture host topology.

13. The method of any one of embodiments 1-12, wherein inferring pairs of logical-architecture host identifiers and network-architecture host identifiers comprises: steps for inferring pairs of logical-architecture host identifiers and network-architecture host identifiers.

14. The method of any one of embodiments 1-13, comprising: measuring response times of, or events or alarms emitted by, each of a plurality of routines of the distributed application; and instructing a user computing device to present a graphical user interface indicative of the response times, events, or alarms.

15. The method of any one of embodiments 1-14, comprising: communicating with agents executing on the plurality of commuting devices, the agents being distinct processes from processes of the distributed application; receiving, from the agents, metrics indicative of performance of the computing devices in executing a plurality of processes including processes other than those of the distributed application.

16. The method of any one of embodiments 1-15, wherein: a plurality of the logical-architecture host identifiers refer to the same computing device among the plurality of computing devices; the logical-architecture host identifiers are provided by application agents each associated with a component of the distributed application, the application agents being configured to measure response times of respective components; the network-architecture host identifiers are provided by infrastructure agents installed on the plurality of computing devices; at least some of the infrastructure agents are installed after automatically discovering at least some of the computing devices by scanning a range of network addresses with requests to determine which addresses result in a response, the requests being formatted according to a protocol to collect information about managed devices on a network; components of multiple distributed applications are executing on at least some of the computing devices; the infrastructure agents are installed on some of the plurality of computing devices before the application agents; and at least some of the application agents are added to at least some components of the distributed application before the at least some components are installed on a respective one of the plurality of computing devices.

17. A tangible, non-transitory, machine-readable medium storing instructions that when executed by a data processing apparatus cause the data processing apparatus to perform operations comprising: any one of embodiments 1-16.

18. A system, comprising: one or more processors; and memory storing instructions that when executed by the processors cause the processors to effectuate operations comprising: any one of embodiments 1-16.

What is claimed is:

1. A method of correlating information organized according to a logical architecture of a distributed application to information organized according to a network architecture of computers executing the distributed application, the method comprising:
obtaining a logical-architecture topology of a logical architecture of a distributed application executing on a plurality of computing devices, wherein:
the logical-architecture topology comprises logical-architecture host identifiers in a logical-architecture namespace, and
each logical-architecture host identifier identifies one computing device among the plurality of computing devices;
obtaining a network-architecture topology of a physical architecture of the plurality of computing devices executing the distributed application, wherein:
the network-architecture topology comprises network-architecture host identifiers in a network-architecture namespace,
the network-architecture namespace is different from the logical-architecture namespace, and
each network-architecture host identifier identifies one computing device among the plurality of computing devices;
inferring pairs of logical-architecture host identifiers and network-architecture host identifiers that refer to the same computing device to produce a cross-namespace mapping that correlates the logical-architecture namespace with the network-architecture namespace, wherein inferring comprises:
obtaining a first set of parameters of a computing device having a given logical-architecture host identifier,
obtaining a second set of parameters of a computing device having a given network-architecture host identifier, and
determining a match between the given logical-architecture host identifier and the given network-architecture host identifier based on correspondence between a plurality of the first set of parameters and a plurality of the second set of parameters; and storing the cross-namespace mapping in memory, wherein:
  a plurality of the logical-architecture host identifiers refer to the same computing device among the plurality of computing devices;
  the logical-architecture host identifiers are provided by application agents each associated with a component of the distributed application, the application agents being configured to measure response times of respective components;
  the network-architecture host identifiers are provided by infrastructure agents installed on the plurality of computing devices;
  at least some of the infrastructure agents are installed after automatically discovering at least some of the computing devices by scanning a range of network addresses with requests to determine which addresses result in a response, the requests being formatted according to a protocol to collect information about managed devices on a network;
  components of multiple distributed applications are executing on at least some of the computing devices;
  the infrastructure agents are installed on some of the plurality of computing devices before the application agents; and
  at least some of the application agents are added to at least some components of the distributed application before the at least some components are installed on a respective one of the plurality of computing devices.

2. The method of claim 1, wherein the first set of parameters are obtained from a distributed performance monitor application configured to determine response times of each of a plurality of components of the distributed application being monitored.

3. The method of claim 1, wherein the first set of parameters comprise parameters obtained by querying an operating system of the computing device having a given network-architecture host identifier for attributes of the computing device having the given network-architecture host identifier, the attributes including processor attributes, memory attributes, and networking attributes.

4. The method of claim 1, wherein the second set of parameters are obtained from an infrastructure management application configured to discover the network-architecture topology and monitor the plurality of computing devices based on communications from infrastructure agents executing on the plurality of computing devices.

5. The method of claim 1, wherein the second set of parameters include portions of a management information base (MIB) obtained via a network connecting the plurality of computing devices with a Simple Network Management Protocol (SNMP) request to the given network-architecture host, the MIB including a hierarchical arrangement of at least some of the second parameters.

6. The method of claim 1, wherein inferring pairs of logical-architecture host identifiers and network-architecture host identifiers comprises:
  matching based on both host name strings and domain name strings.

7. The method of claim 1, wherein inferring pairs of logical-architecture host identifiers and network-architecture host identifiers comprises:
  matching based on Internet Protocol address, medium access control address, agent instance identifiers, and virtual machine identifiers.

8. The method of claim 1, wherein inferring pairs of logical-architecture host identifiers and network-architecture host identifiers comprises:
  determining an edit distance between at least one parameter among the first set of parameters and at least one parameter among the second set of parameters;
  parsing a prefix or suffix from at least one parameter among the first set of parameters or second set of parameters and matching another string to the prefix or suffix; or
  parsing a substring denoted by delimiters in at least one parameter among the first set of parameters or second set of parameters and matching another string to the substring.

9. The method of claim 1, comprising:
  determining response times for each of a plurality of routines executed to service a transaction;
  for a given routine, identifying a logical-architecture host identifier in the logical-architecture topology of a computing device upon which the given routine was executed to service the transaction;
  accessing the mapping to identify a network-architecture host identifier in the network-architecture topology; and
  associating the response time of the given routine with a host in the network-architecture based on the network-architecture host identifier.

10. The method of claim 9, comprising:
  retrieving utilization metrics of the associated host in the network-architecture.

11. The method of claim 1, comprising:
  associating infrastructure management monitoring data indexed according to the network-architecture topology with application performance data indexed according to the logical-architecture topology.

12. The method of claim 1, comprising:
  causing a display to be presented that includes an indication of a response time of at least one of a plurality of routines executed in the course of servicing one or more transactions with the distributed applications;
  receiving a selection of a user interface associated with the indication of the response time;
  using the cross-namespace mapping to identify a network-architecture host identifier of a host upon which the at least one of the plurality of routines was executed; and
  causing a display to be presented that identifies the host upon which the at least one of the plurality of routines was executed in the context of the network-architecture host topology.

13. The method of claim 1, wherein inferring pairs of logical-architecture host identifiers and network-architecture host identifiers comprises:
  steps for inferring pairs of logical-architecture host identifiers and network-architecture host identifiers.

14. The method of claim 1, comprising:
  measuring response times of, or events or alarms emitted by, each of a plurality of routines of the distributed application; and
  instructing a user computing device to present a graphical user interface indicative of the response times, events, or alarms.

15. The method of claim 1, comprising:
  communicating with agents executing on the plurality of commuting devices, the agents being distinct processes from processes of the distributed application;

receiving, from the agents, metrics indicative of performance of the computing devices in executing a plurality of processes including processes other than those of the distributed application.

16. The medium of claim 1, wherein:
the first set of parameters comprise memory utilization of the computing device having the given network-architecture host identifier, the memory utilization being determined using a processor of the computing device having the given network-architecture host identifier; and
matching is based on the memory utilization of the computing device having the given network-architecture host identifier.

17. A tangible, non-transitory, machine-readable medium storing instructions that when executed by one or more computers effectuate operations comprising:
obtaining a logical-architecture topology of a logical architecture of a distributed application executing on a plurality of computing devices, wherein:
the logical-architecture topology comprises logical-architecture host identifiers in a logical-architecture namespace, and
each logical-architecture host identifier identifies one computing device among the plurality of computing devices;
obtaining a network-architecture topology of a physical architecture of the plurality of computing devices executing the distributed application, wherein:
the network-architecture topology comprises network-architecture host identifiers in a network-architecture namespace,
the network-architecture namespace is different from the logical-architecture namespace, and
each network-architecture host identifier identifies one computing device among the plurality of computing devices;
inferring pairs of logical-architecture host identifiers and network-architecture host identifiers that refer to the same computing device to produce a cross-namespace mapping that correlates the logical-architecture namespace with the network-architecture namespace, wherein inferring comprises:
obtaining a first set of parameters of a computing device having a given logical-architecture host identifier,
obtaining a second set of parameters of a computing device having a given network-architecture host identifier, and
determining a match between the given logical-architecture host identifier and the given network-architecture host identifier based on correspondence between a plurality of the first set of parameters and a plurality of the second set of parameters; and
storing the cross-namespace mapping in memory, wherein:
a plurality of the logical-architecture host identifiers refer to the same computing device among the plurality of computing devices;
the logical-architecture host identifiers are provided by application agents each associated with a component of the distributed application, the application agents being configured to measure response times of respective components;
the network-architecture host identifiers are provided by infrastructure agents installed on the plurality of computing devices;
at least some of the infrastructure agents are installed after automatically discovering at least some of the computing devices by scanning a range of network addresses with requests to determine which addresses result in a response, the requests being formatted according to a protocol to collect information about managed devices on a network;
components of multiple distributed applications are executing on at least some of the computing devices;
the infrastructure agents are installed on some of the plurality of computing devices before the application agents; and
at least some of the application agents are added to at least some components of the distributed application before the at least some components are installed on a respective one of the plurality of computing devices.

18. The medium of claim 17, wherein the first set of parameters are obtained from a distributed performance monitor application configured to determine response times of each of a plurality of components of the distributed application being monitored.

19. The medium of claim 17, wherein the first set of parameters comprise parameters obtained by querying an operating system of the computing device having a given network-architecture host identifier for attributes of the computing device having the given network-architecture host identifier, the attributes including processor attributes, memory attributes, and networking attributes.

20. The medium of claim 17, wherein the second set of parameters are obtained from an infrastructure management application configured to discover the network-architecture topology and monitor the plurality of computing devices based on communications from infrastructure agents executing on the plurality of computing devices.

* * * * *